(12) United States Patent
Pannek

(10) Patent No.: US 6,933,166 B2
(45) Date of Patent: Aug. 23, 2005

(54) METHOD FOR MANUFACTURING A COMPONENT, IN PARTICULAR A THERMAL SENSOR, AND THERMAL SENSOR

(75) Inventor: Thorsten Pannek, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/422,320

(22) Filed: Apr. 23, 2003

(65) Prior Publication Data

US 2004/0029309 A1 Feb. 12, 2004

(30) Foreign Application Priority Data

May 22, 2002 (DE) .......................................... 102 22 499

(51) Int. Cl.$^7$ .............................................. H01L 21/00
(52) U.S. Cl. ............................ 438/54; 438/71; 257/467
(58) Field of Search ............................ 257/467; 438/54, 438/53, 56, 57, 71, 14

(56) References Cited

U.S. PATENT DOCUMENTS

| | | | |
|---|---|---|---|
| 5,523,564 A | * | 6/1996 | Yamada et al. .......... 250/338.1 |
| 5,689,087 A | | 11/1997 | Jack ............................ 136/213 |
| 6,171,645 B1 | | 1/2001 | Smith et al. ................. 438/758 |
| 6,359,276 B1 | * | 3/2002 | Tu ............................ 250/338.1 |
| 2001/0036747 A1 | | 11/2001 | Levert et al. ................ 438/758 |

FOREIGN PATENT DOCUMENTS

| | | | | |
|---|---|---|---|---|
| DE | 199 24 320 | | 5/1999 | |
| DE | 100 46 622 | | 4/2002 | |
| EP | 0789236 A1 | * | 8/1997 | .......... G01N/21/77 |
| JP | 04125929 | * | 4/1992 | ................. 438/624 |

* cited by examiner

Primary Examiner—Caridad Everhart
(74) Attorney, Agent, or Firm—Kenyon & Kenyon

(57) ABSTRACT

A method of manufacturing a component, in particular a thermal sensor, and a thermal sensor. The component has at least two regions having different heat conductivities, a surface region being created in a substrate and the heat conductivity of the surface region being lower than that of the surrounding substrate. For producing a flat topography on the component a layer is created which covers the surface region. The layer and the surface region have at least approximately similar physical properties.

18 Claims, 2 Drawing Sheets

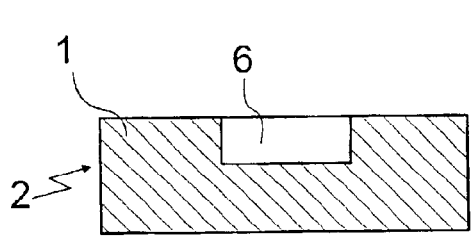
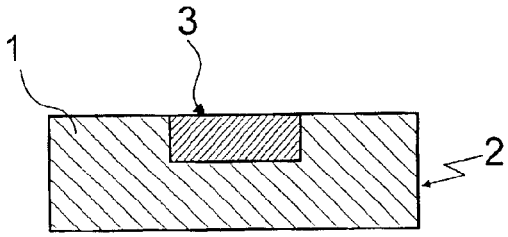
Fig. 8  Fig. 9
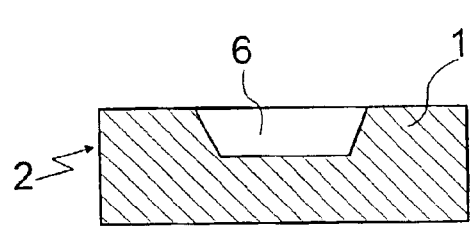
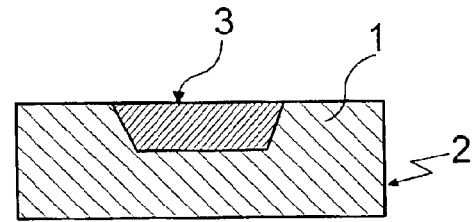
Fig. 10  Fig. 11
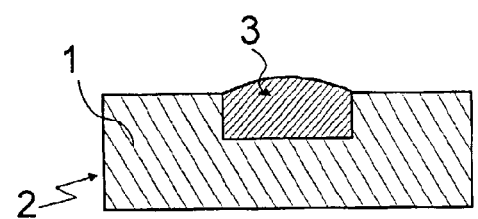
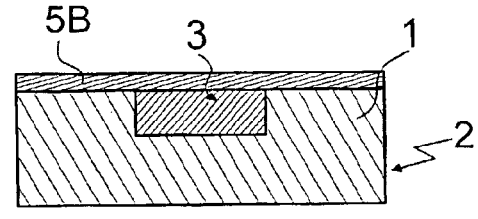
Fig. 12  Fig. 13
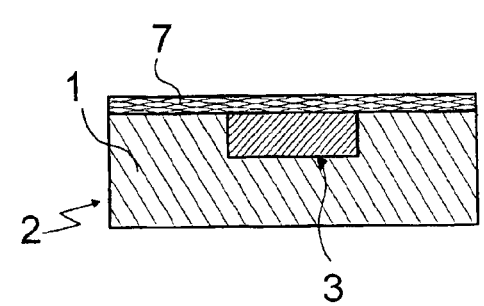
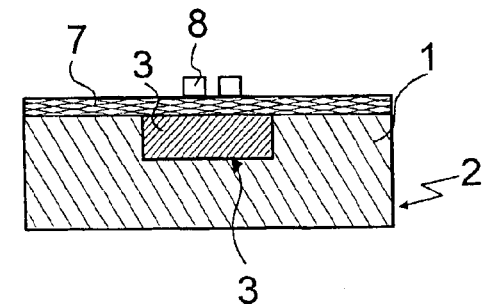
Fig. 14  Fig. 15

METHOD FOR MANUFACTURING A COMPONENT, IN PARTICULAR A THERMAL SENSOR, AND THERMAL SENSOR

BACKGROUND INFORMATION

In practice, numerous micromechanical thermal sensors having a thermally decoupled region are known which are used in many fields of everyday applications, such as temperature sensors or flow sensors. Such sensors have the predominant common feature that sensitive measuring elements are thermally decoupled from the surroundings to allow very rapid and/or highly sensitive measurements to be carried out. In practice, such thermal decoupling is achieved for example by etching on the backside of a substrate such as silicon, for example, a free-standing membrane being created as a result of the etching.

Furthermore, a "sacrificial layer" technology is known by which a cavern is created in a substrate to achieve the thermal decoupling. A layer to be sacrificed may optionally remain. If this layer has a sufficiently low heat conductivity with respect to the surrounding material, thermal decoupling of the sensitive measuring elements in the sensors results without this layer being removed.

However, it is disadvantageous that such methods for manufacturing sensors having a thermally decoupled region are difficult to manage from a process engineering standpoint, complicated to carry out, and costly. An additional disadvantage is that in layers which are created in a substrate such as silicon, for example, undesired arching occurs on the surface during subsequent processes on account of structural differences, volumetric expansion, and the resulting mechanical stress.

SUMMARY OF THE INVENTION

The method according to the present invention for manufacturing a component, in particular a thermal sensor, having a thermally decoupled region in which for producing a flat topography on the sensor a layer covering is created which covers the surface region, the layer and the surface region having at least approximately similar physical properties, has the advantage that a component is provided which has good thermal decoupling in partial areas while at the same time having a flat topography or surface.

Using the method according to the present invention for manufacturing a component, in particular a thermal sensor, having a thermally decoupled region, in which a thermally decoupled surface region of a substrate is created by spin-on deposition or dispensing of sol gel into a recess in the substrate and a subsequent solidification process for the sol gel, during which a porous solid is produced which has a firm connection to the substrate as well as thermal and mechanical resistance, a region or a layer which has a lower heat conductivity than the material which surrounds this region is advantageously provided in the substrate in a simple manner. At the same time, a sensor having a flat topography is provided by the method according to the present invention, since undesired arching of the surface region is eliminated or greatly reduced.

The component according to the present invention, whose surface region is formed, at least in partial areas, from a solidified sol gel embedded in a substrate which is preferably silicon, advantageously has good thermal decoupling and at the same time has a flat topography. This is accomplished by using a sol gel which for the definition of a thermally decoupled region is introduced in a locally delimited manner into a recess in the substrate and in a subsequent solidification process is converted to a porous solid, and which advantageously forms a flat topography on the surface of the substrate.

The term "sol gel" is used here to describe the subject matter of the present invention, and its meaning is described in greater detail in the introduction to the reference book "Sol Gel Science: the Physics and Chemistry of Sol Gel Processing," C. Jeffrey Brinker, George W. Scherer, 1990, Academic Press Inc., San Diego. In the cited work, the definition of the term "sol gel" is further discussed as the manufacture of ceramic materials by producing a sol, gelling this sol, and removing a solvent. The sol may be produced using an inorganic or organic precursor, for example metal oxides or nitrates, and may preferably be composed of compact oxidic particles or polymer chains. In addition, the term "ceramic" is also intended to include organically modified materials such as ORMOSILs, CERAMERs, or ORMOCERs. In particular, materials based on silicates ($SiO_x$, for example) are semiconductor-compatible, and compared to silicon have a much lower heat conductivity which preferably is in the range of two orders of magnitude smaller.

Alternatives to a solidification process in which a fluid sol gel is converted to a porous solid are provided by complete condensation, drying, or pyrolysis of the sol gel, the porous solid as the end product possibly being $SiO_x$, for example. In particular, a sol gel may be dried by simple evaporation of the solvent contained in a sol gel at a drying temperature of room temperature or higher, the resulting porous solid also being known as xerogel or "dry" gel. If the drying process is carried out in a supercritical region of the phase diagram of a sol gel, the porous solid ultimately produced on the surface region in the substrate is known as aerogel.

In both cases, depending on the type of drying selected, a more or less porous solid structure, composed of $SiO_x$, for example, is produced which has a correspondingly lower heat conductivity. The above-mentioned aerogels have a very high degree of porosity characterized by a solids fraction of down to 1% or even less, relative to the total volume of the aerogel. The aerogels therefore have very low heat conductivities. Such high degrees of porosity are achievable in particular on account of the greatly reduced surface tension when sol gels are dried in the supercritical region.

The starting materials for the substrate of the component according to the present invention as well as for the surface region created therein are economical, and may be semiconductor-compatible components. A sol gel is introduced into a recess in the substrate, using simple processes such as dispensing or spin-on deposition, and then, using the solidification process, a thermally and mechanically stable, porous solid region having low heat conductivity is produced in the substrate.

BRIEF DESCRIPTION OF THE DRAWINGS

FIG. 8 shows a substrate in which a recess is introduced by a physical-chemical etching process.

FIG. 9 shows the substrate according to FIG. 8 in which a sol gel is introduced.

FIG. 10 shows a substrate in which a recess is introduced by a wet chemical etching process.

FIG. 11 shows the substrate according to FIG. 10, the recess therein being filled in by a sol gel.

FIG. 12 shows a surface region of a sensor having an arched surface.

FIG. 13 shows the sensor according to FIG. 12, an additional layer being provided on the substrate and the surface region.

FIG. 14 shows the surface region and the substrate according to FIG. 13 having a passivation layer.

FIG. 15 shows the sensor according to FIG. 14, sensor structures being situated on the passivation layer.

DETAILED DESCRIPTION

Figure 1:
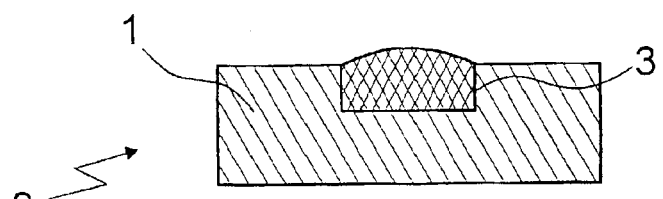
FIG. 1 shows a sensor having a substrate and a surface region having an arch.

FIG. 1 illustrates in highly schematic form a substrate 1 for a component designed as a thermal sensor 2 having a thermally decoupled region 3. Substrate 1 and thermally decoupled region 3 have different heat conductivities, thermally decoupled region 3 forming a surface together with substrate 1 and having a heat conductivity that is lower—preferably by two to three orders of magnitude—than that of substrate 1.

Surface region 3 is composed of oxidized, porous silicon 3A which is formed directly from substrate 1 by an appropriate surface treatment of the substrate. To this end, a region of substrate 1, which is composed of silicon, present as the result of an electrochemical etching process known as such, is converted to a porous state and is subsequently oxidized to produce a stable material phase. The silicon in substrate 1 is converted in partial areas, using the etching process, into a porous sponge-like structure having altered physical properties. The sponge-like structure in porous silicon region 3A is characterized by the fact that a large part of the silicon is absent and that only small crystallites are present, with the result that this porous silicon region 3A has a lower heat conductivity than substrate 1 surrounding it.

As the result of volumetric changes and stresses as porous silicon 3A in surface region 3 is oxidized, undesired arching occurs on the surface of surface region 3, as illustrated in FIG. 1.

Figure 2:
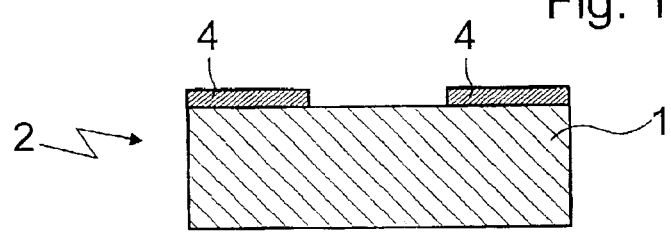
FIG. 2 shows a substrate of a sensor having a substrate which has masking applied in partial areas.
Figure 3:
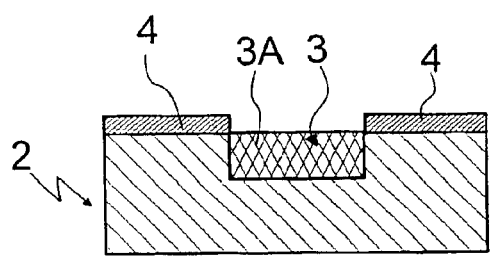
FIG. 3 shows the substrate according to FIG. 2 having a porous surface region.

The various manufacturing phases for porous silicon region 3A in substrate 1 are illustrated in a highly schematic form in FIGS. 2 and 3, FIG. 2 showing initially untreated substrate 1 with a masking 4 applied in partial areas, and FIG. 3 showing substrate 1 including silicon region 3A which has been formed having a porous structure up to a defined layer depth.

Figure 4:
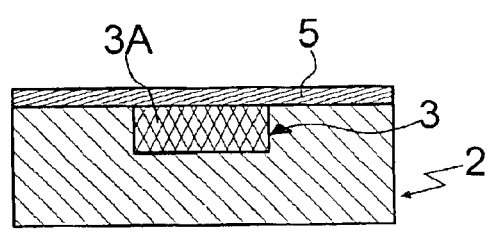
FIG. 4 shows a substrate of a sensor having a porous surface region and an additional porous surface layer.

FIG. 4 illustrates substrate 1 which has an additional porous silicon layer 5 extending over the entire cross section, the silicon layer having a smaller layer thickness or lesser layer depth than porous silicon region 3A and being additionally created on substrate 1 before silicon region 3A is oxidized and after masking 4 is removed. Additional porous silicon layer 5 and porous silicon layer 3A have essentially the same porous structure.

As the result of additional porous silicon layer 5, arching of surface region 3 during the oxidation of porous silicon regions 3A and 5 of substrate 1 following production of same is reduced or eliminated altogether, since the stresses and expansions in volume of porous silicon region 3A which cause arching are reduced by the presence of additional porous silicon layer 5. The degree of arching of surface region 3 is significantly influenced by the thickness of additional porous silicon layer 5.

To obtain a region of distinct thermal decoupling on the side of substrate 1 on which surface region 3 is provided, after the oxidation process additional porous silicon layer 5 which is applied to form a flat surface on sensor 2 or for planarization of surface region 3 is removed again from substrate 1 and surface region 3 by back-etching, resulting in two regions precisely delimited with respect to one another having markedly different heat conductivities and a sensor 2 having a flat topography.

The flat topography of sensor 2 is achieved primarily by the fact that surface region 3 and additional porous silicon layer 5 which covers it have mutually corresponding physical properties, and that arching of surface region 3 during oxidation is avoided. If arching nevertheless occurs during oxidation, or if additional porous silicon layer 5 is not intended after oxidation, the two porous and oxidized silicon regions 3A and 5 are uniformly etched at the same etch rate, which results from the mutually corresponding physical properties of surface region 3 and additional silicon layer 5, using the back-etching process. After back-etching, previously arched surface region 3 together with the surface of surrounding substrate 1 of sensor 2 form a flat topography, the surface of substrate 1 which surrounds surface region 3 again being formed from unoxidized, nonporous silicon having a higher heat conductivity.

Figure 5:
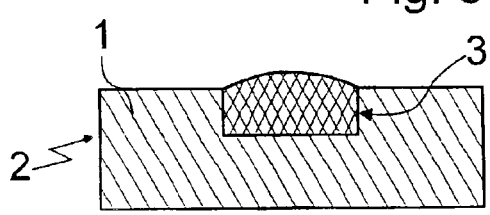
FIG. 5 shows a surface region of a sensor having an arched surface.
Figure 6:
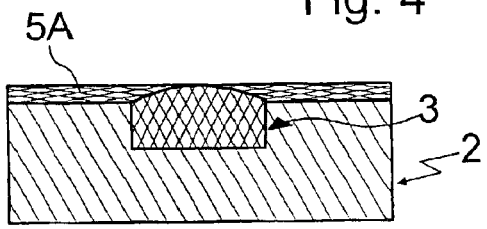
FIG. 6 shows a surface region of a sensor coated with a layer.
Figure 7:
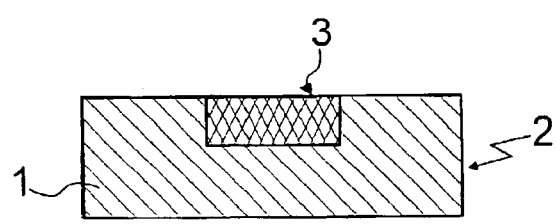
FIG. 7 shows a sensor having a flat topography, the layer according to FIG. 6 or a porous surface layer of the substrate according to FIG. 4 being removed by etching.

FIGS. 5 through 7 illustrate the stepwise manufacture of a thermal sensor 2 having a thermally decoupled region. FIG. 5 shows substrate 1, formed from silicon, in which an oxidized, porous silicon region, i.e., surface region 3, produced from substrate 1 in the above-mentioned manner is situated. On its side facing surrounding substrate 1, surface region 3 has an arch which rises above the surface of surrounding substrate 1, resulting in an uneven topography of sensor 2.

To manufacture a blank for sensor 2 having a flat topography, as shown in FIG. 6, a layer 5A of sol gel covering surface region 3 is applied to arched surface region 3 and surrounding substrate 1, the sol gel layer after a solidification process having at least approximately similar physical properties and a similar degree of porosity with regard to surface region 3. Layer 5A, composed of solidified sol gel or a porous solid which in the meantime has become thermally and mechanically stable, and surface region 3 are then etched at the same etch rate, so that layer 5A and the arching on surface region 3 are equally removed up to the point of the original surface of substrate 1, and the blank for sensor 2 has a flat topography. This design of the blank for sensor 2 is illustrated in FIG. 7.

Metal alkoxide precursors such as tetraethylorthosilicates (TEOS), for example, are used among other materials to manufacture a sol gel. By admixture of an acidic or basic catalyst such as hydrochloric acid or $NH_4OH$, for example, hydrolysis is initiated during which the alkoxide ($OC_xH_y$) groups are replaced by hydroxyl (OH) groups. The subsequent condensation reaction then creates the intended siloxane bonds (Si—O—Si), with alcohols or water as by-product, which constitutes the gelling process. Depending on the type and quantity of catalyst used, such a gelling process may last from several minutes to days. It is possible to establish an intended viscosity of a sol gel by modifying this procedure.

To prevent too rapid gelling and to maintain the sol gel in a workable state, after a certain burn-in period or a certain degree of gelling the hydroxyl groups are in turn replaced by nonreactive alkoxide groups. This preferably is achievable by adding chemical substances such as hexamethyldisilazane (HDMS) and/or hexane. If the gelling has already advanced too far in partial areas, a sol gel may be mechanically reliquefied by dispersion, for example.

The sol gel is applied at the intended or preferred viscosity to substrate 1 and surface region 3 by spin-on deposition or dispensing. After application on a substrate 1, the sol gel is then solidified by pyrolysis or further condensation, preferably at temperatures around 400° C., and forms a porous solid.

FIGS. 8 and 9 show substrate 1 having a recess 6, grooved from substrate 1 with steep etched edges, using an anisotropic physical-chemical etching method. Substrate 1 is formed from silicon, as before. To produce surface region 3, a sol gel is introduced into recess 6, and FIG. 9 illustrates an intended or ideal flat surface condition after sol gel is filled into recess 6 and solidified. Surface region 3, composed of solidified sol gel or solid which in the meantime has become porous, together with substrate 1 form a flat topography.

As shown in FIGS. 10 and 11, recess 6 is provided in substrate 1 composed of silicon, using an anisotropic, wet chemical etching method which produces a recess having sloped etched edges. According to the illustration in FIG. 11, recess 6 is likewise filled with a sol gel to form surface region 3, which, after solidification of the sol gel, together with substrate 1 likewise form a flat topography. The sol gel is introduced into recess 6 of substrate 1 according to FIG. 9, and also according to FIG. 11 is introduced by spin-on deposition, it naturally being within the discretion of one skilled in the art to introduce sol gel into recess 6 by dispensing or another suitable filling method.

FIG. 12 illustrates the case in which arching in surface region 3 results when sol gel is introduced into recess 6 of substrate 1 and is subsequently solidified or converted into a porous solid phase. To achieve a flat topography of sensor 2 by planarization, as illustrated in FIG. 13 a thin layer 5B of sol gel is applied to substrate 1 and surface region 3 in a second spin-on deposition procedure. The sol gel in layer 5B is then solidified, resulting in a flat topography made of porous solid. If necessary, additional layer 5B together with the arching in surface region 3 are uniformly etched, so that the blank for sensor 2 has a surface, formed after etching of substrate 1 and the porous area of surface region 3, of varying heat conductivity.

To protect surface region 3 from environmental influences, the surface region is preferably provided with a passivation layer 7, illustrated in FIGS. 14 and 15, which is applied to surface region 3 before sensor structures 8 are applied.

The starting materials used here for manufacturing sensor 2 are economical and semiconductor-compatible. In addition, very simple processes such as dispensing or spin-on deposition are used in the manufacture to create a thermally decoupled region in a substrate. Only surface micromechanical processes are used in the manufacturing method, which in particular improves the mechanical stability as a result of filling the recess produced in the substrate, and thus simplifies the packaging of such sensors as well.

It is understood that the thermal sensors may be sensors which are used in micromechanical fields, the subject matter of the present invention not being limited to thermal sensors as such. Of course, within the discretion of one skilled in the art, components may be manufactured according to the present invention which are used for other applications. Thus, it is conceivable to design actuators according to the present invention and to integrate these into ignition devices for airbag systems, for example.

What is claimed is:

1. A method for manufacturing a component comprising:
providing at least two regions having different heat conductivities, the providing step including creating a surface region in a surrounding substrate, a heat conductivity of the surface region being lower than that of the surrounding substrate; and
creating a layer covering the surface region for producing a flat topography over at least a transition on a surface on the component between the surface region and the surrounding substrate, the layer and the surface region having at least substantially corresponding physical properties.

2. The method according to claim 1, wherein the component is a micromechanical thermal sensor.

3. The method according to claim 1, further comprising:
creating a recess in the substrate using one of an anisotropic wet chemical and an anisotropic physical-chemical etching process;
introducing a sol gel into the recess by one of dispensing and spin-on deposition to form the surface region; and
subsequently applying the layer to the substrate.

4. The method according to claim 1, further comprising removing the layer using an etching process.

5. The method according to claim 1, further comprising providing the component with a passivation layer which covers the surface region and to which sensor structures are applied.

6. The method according to claim 1, further comprising:
masking the substrate at least in partial areas; and
making porous non-masked regions of the substrate up to a defined layer depth.

7. The method according to claim 6, further comprising, after removal of masking, for creating the layer covering the surface region, making the substrate porous on a side of the surface region up to a defined layer depth which is less than a layer depth of the surface region.

8. The method according to claim 7, further comprising oxidizing the layer and the surface region.

9. The method according to claim 7, further comprising removing the layer over an entire layer depth using an etching process.

10. The method according to claim 1, wherein the surface region is created by making a region of the substrate porous and then oxidizing it, and the layer is created by spin-on deposition of sol gel and subsequent solidification.

11. A method for manufacturing a component that is a thermal sensor comprising:
providing at least two regions having different heat conductivities, the providing step including creating a surface region in a surrounding substrate, a heat conductivity of the surface region being lower than that of the surrounding substrate, the surface region being created by one of spin-on deposition and dispensing of sol gel into a recess in the substrate and a subsequent solidification process for the sol gel, forming a porous solid structure from the solidified sol gel.

12. The method according to claim 11, further comprising creating the recess in the substrate using one of an anisotropic wet chemical and an anisotropic physical-chemical etching process.

13. The method according to claim 11, further comprising applying a layer covering the surface region for producing a flat topography on the component, the layer and the surface region having at least substantially corresponding physical properties.

14. The method according to claim 11, further comprising providing the component with a passivation layer which covers the surface region and to which sensor structures are applied.

15. A component comprising:

a substrate composed of silicon, the substrate having a recess; and at least two regions having different beat conductivities, the at least two regions including a surface region situated in the surrounding substrate, a heat conductivity of the surface region being lower than that of the surrounding substrate, the surface region being composed of a solidified, porous sol gel which is introduced into the recess in the substrate, and wherein the component is a thermal sensor.

16. A component comprising:

a substrate composed of silicon, the substrate having a recess;

at least two regions having different heat conductivities, the at least two regions including a surface region situated in the surrounding substrate, a heat conductivity of the surface region being lower than that of the surrounding substrate, the surface region being composed of a solidified, porous sol gel which is introduced into the recess in the substrate; and a layer covering the surface region, the layer and the surface region having at least substantially corresponding physical properties.

17. The component according to claim 16, wherein the layer is formed from a solidified, porous sol gel.

18. The component according to claim 17, further comprising:

a passivation layer situated on the layer; and sensor structures situated on the passivation layer.

* * * * *